United States Patent
Ryu (10) Patent No.: US 7,634,115 B2
(45) Date of Patent: Dec. 15, 2009

(54) METHODS FOR TAGGING PERSON IDENTIFICATION INFORMATION TO DIGITAL DATA AND RECOMMENDING ADDITIONAL TAG BY USING DECISION FUSION

(75) Inventor: Jung-hee Ryu, Seoul (KR)

(73) Assignee: Olaworks, Inc., Seoul (KR)

( * ) Notice: Subject to any disclaimer, the term of this patent is extended or adjusted under 35 U.S.C. 154(b) by 0 days.

(21) Appl. No.: 12/376,664

(22) PCT Filed: Oct. 31, 2006

(86) PCT No.: PCT/KR2006/004494

§ 371 (c)(1),
(2), (4) Date: Feb. 6, 2009

(87) PCT Pub. No.: WO2008/020663

PCT Pub. Date: Feb. 21, 2008

(65) Prior Publication Data

US 2009/0256678 A1    Oct. 15, 2009

(30) Foreign Application Priority Data

Aug. 17, 2006  (KR) ............... 10-2006-0077416

(51) Int. Cl.
*G06K 9/00* (2006.01)
*H04N 5/225* (2006.01)
(52) U.S. Cl. .................... 382/118; 348/169
(58) Field of Classification Search ............. 382/115, 382/116, 117, 118; 348/154, 155, 169, 170, 348/171, 172, 208.14, 267, 352; 700/237
See application file for complete search history.

(56) References Cited

U.S. PATENT DOCUMENTS 5,835,616 A * 11/1998 Lobo et al. ............... 382/118

(Continued)

FOREIGN PATENT DOCUMENTS

KR    10-2005-0085576    8/2005

(Continued)

OTHER PUBLICATIONS

Natsev, A. et al., Over-complete representation and fusion for semantic concept detection, 2004 International Conference on Image Processing (ICIP), Oct. 24-27, 2004, vol. 4 See Features (pp. 2375-2378).

(Continued)

*Primary Examiner*—Abolfazl Tabatabai
(74) *Attorney, Agent, or Firm*—Husch Blackwell Sanders LLP (57) ABSTRACT

Person identification information is extracted from digital data with a high accuracy and additional tag is recommended by adopting a decision fusion. In other words, the person identification information is acquired by using various additional information to tag the same to the digital data automatically as a person tag, in a digital data management system in which the person identification information is extracted from the digital data by referring to its attributes and contents; and specific digital data having specific tags which are same as those attached to newly created digital data are found out and then candidate tags which are attached to the specific digital data except the specific tags are provided to a monitor in order for a user to choose one or more proper tags from the candidate tags, which are desired to be attached to the newly created digital data additionally, by using the decision fusion.

19 Claims, 7 Drawing Sheets

U.S. PATENT DOCUMENTS 6,035,055 A * 3/2000 Wang et al. .................. 382/118

FOREIGN PATENT DOCUMENTS

KR    10-2006-0048225       5/2006

OTHER PUBLICATIONS

Abdel_Mottaleb, M. et al., Content-based photo album management using faces' arrangement, 2004 IEEE International Conference on Multimedia and Expo (ICME), Jun. 27-30, 2004, vol. 3 See Features (pp. 2071-2074).

* cited by examiner

| DB | Probability P(%) Acquired by Using N Cues Through the Bayesian Inference |
|---|---|
| 1 | 3 |
| 2 | 2 |
| ... | ... |
| 100 | 8 |

→ Top 9 List ized. Since digital data are being frequently produced and widely shared, digital data should be systematically managed. However, it may be difficult to manage digital data (e.g., search and information extraction) due to the massive amount of the information therein.

METHODS FOR TAGGING PERSON IDENTIFICATION INFORMATION TO DIGITAL DATA AND RECOMMENDING ADDITIONAL TAG BY USING DECISION FUSION

TECHNICAL FIELD

The present invention relate to a method capable of extracting person identification information from digital data with a high accuracy and a method for recommending additional tag with a high precision by adopting a decision fusion. More particularly, the present invention are directed to a method for acquiring the person identification information by using various additional information more effectively to tag the same to the digital data automatically as a person tag, in a digital data management system in which the person identification information is extracted from the digital data by referring to its attributes and contents and a method for finding out specific digital data having specific tags which are same as those attached to newly created digital data and then providing candidate tags which are attached to the specific digital data except the specific tags to a monitor of an electronic equipment in order for a user of the electronic equipment to choose one or more proper tags from the candidate tags, which are desired to be attached to the newly created digital data additionally, by using the decision fusion.

BACKGROUND ART

Recently, the amount of digital data, which are shared by a lot of people, has been tremendously increased, while digital devices such as digital cameras, camera-attached mobile communication instruments, digital camcorders and MP3 players are popularized. Since digital data are being frequently produced and widely shared, digital data should be systematically managed. However, it may be difficult to manage digital data (e.g., search and information extraction) due to the massive amount of the information therein.

A scheme for classifying or integrating digital data by using a tag is widely known as one of the conventional techniques for managing digital data. A "tag" can be understood as additional data attached to digital data for the purpose of accessing or searching for the digital data as quickly as possible. Such a tag is generally comprised of a series of characters, numbers, or a combination of numbers and characters.

There are various types of tags as follows: a space tag, a person tag, an object tag, a time tag and the like. Especially, a lot of attempts have been made to extract the person tags from digital data with a high accuracy.

Figure 7:
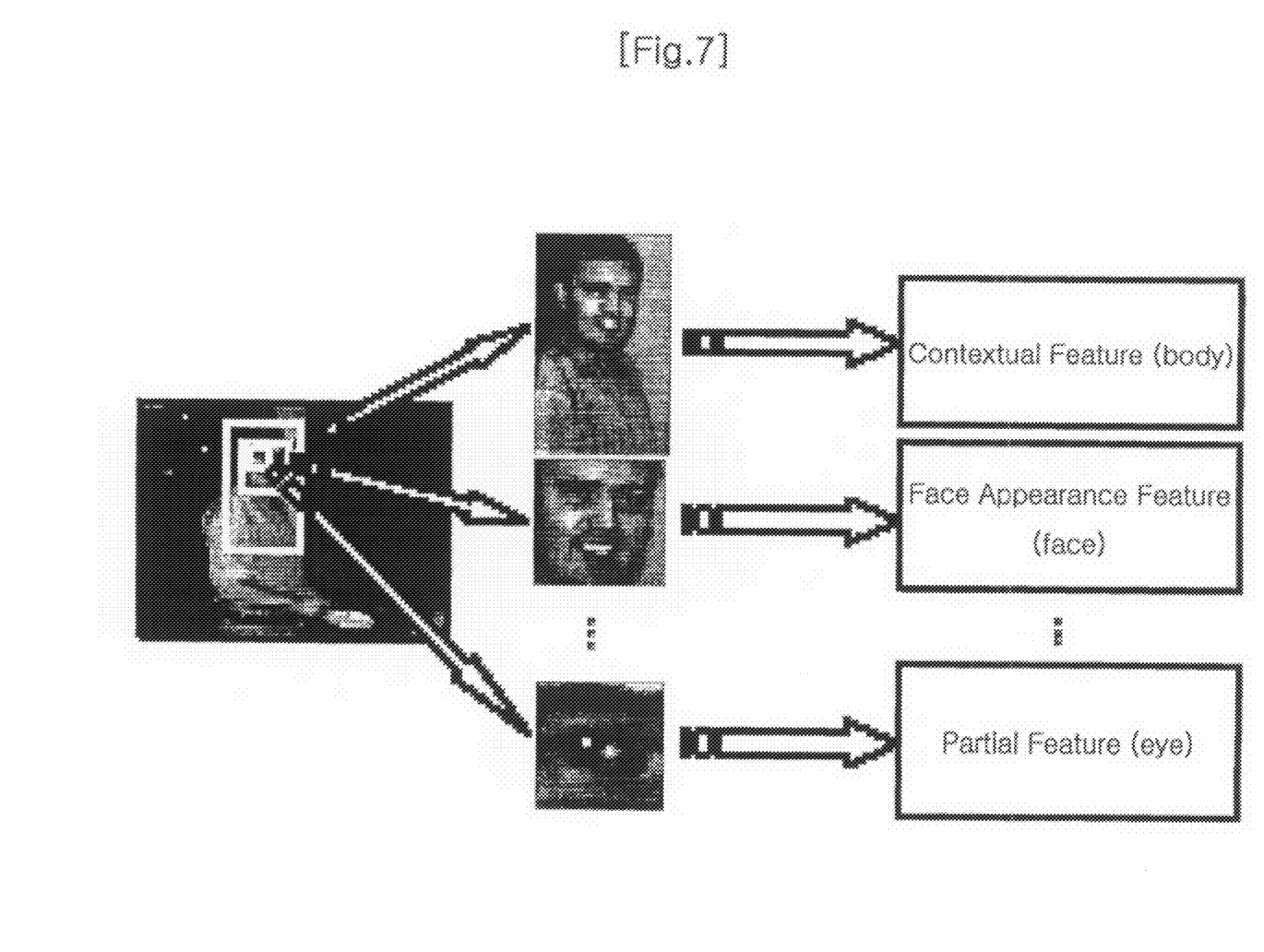
FIG. 7 depicts a prior art for enhancing the accuracy of the face recognition.

FIG. 7 describes a face recognition by using a face appearance feature and a contextual feature. In this regard, Microsoft Research Asia has published an article entitled "Automated Annotation of Human Faces in Family Albums" in 2003. This article discloses a technique of adding the contextual feature to the conventional face recognition algorithm in order to improve a recognition rate of people included in images of photos. The contextual feature represents that people included in images of a plurality of photos taken on the same day or in the same event may wear the same clothes. Such contextual feature can be used to distinguish each of the people in the photos.

According to the above-mentioned article, the face recognition algorithm based on the contextual feature cannot be applied to two or more sheets of photos taken on distant dates, e.g., at intervals of three or more days. Thus, the article says that the photos are required to be taken within at most two days to apply such similarity, i.e., the contextual feature.

DISCLOSURE OF INVENTION

Technical Problem

However, the conventional face recognition technique disclosed in the above article lacks in accuracy in that the face recognition is performed by analyzing only the similarity of clothes of people within a specific range of time and in addition to the similarity of the face appearance feature. For example, there may often be a case where the same person wears different clothes even when the specific range of time is set to one or two days. Specifically, during spring, autumn, or winter, we can imagine that one who wears a jumper over a shirt in an outdoor area may wear the shirt merely in an indoor area. Moreover, when a person whose face and body tilted to one side is taken a photograph of, there may be a severe problem in that the accuracy of the recognizing rate of the clothes and the face of the person is degraded.

Meanwhile, the prior arts have a drawback in that when a user intends to assign additional tags in addition to tags (for example, at least one tag selected from the space tags, the person tags, the object tags, and the time tags) given upon creation of new digital data, the user has to manually input those tags. For example, in a web-based system of Flickr™ (http://www.flickr.com)(hereinafter, "flickr"), which is one of the conventional digital data management systems, when a user intends to assign one or more additional tags to digital data (for example, "poppy") after tagging the digital data as a "dog" while uploading the digital data, e.g., photos, of a dog to the flickr, the additional tags should be inputted manually. Such inconveniences increase as the number of the additional tags increase.

Technical Solution

It is, therefore, an object of the present invention to provide a method for automatically attaching person identification information as a person tag to digital data by performing a face recognition process with a significantly high accuracy than that of the conventional face recognition process, to thereby allow a user to manage the digital data more conveniently and to share the same with other users, by using a decision fusion.

Further, it is another object of the present invention to provide a method for finding out specific digital data having specific tags which are same as those attached to newly created digital data and then providing candidate tags which are attached to the specific digital data except the specific tags to a monitor of an electronic equipment in order for a user of the electronic equipment to choose one or more proper tags from the candidate tags, which are desired to be attached to the newly created digital data additionally, by using the decision fusion.

ADVANTAGEOUS EFFECTS

The present invention is capable of extracting the person identification information from the digital data with high accuracy. More specifically, when tags are automatically attached to the digital data based on the extracted person identification information in a digital data management system, the present invention is capable of attaching the person identification information, i.e., the person tag, to the digital data more effectively by adopting various additional information on people appearing on the digital data.

Moreover, the present invention can significantly reduce the user's burden of inputting additional tags by perceiving the residual tags which are frequently used for the existing digital data including the same tags as those assigned to the newly created digital data, through the use of the decision fusion, thereby assigning one of the residual tags to the digital data.

BRIEF DESCRIPTION OF THE DRAWINGS

The above objects, features and advantages of the present invention will become more apparent from the following detailed description when taken in conjunction with the accompanying drawings, in which.

BEST MODE FOR CARRYING OUT THE INVENTION

The detailed description of the present invention illustrates specific embodiments in which the present invention can be performed with reference to the attached drawings.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

The configurations of the present invention for accomplishing the objects of the present invention are as follows.

In accordance with one aspect of the present invention, there is provided a method for tagging identification information of a first person to a first digital data created by using a digital equipment in a digital data management system, wherein the digital data management system includes both identification information and life pattern information of a user who creates a plurality of digital data by using the digital equipment, and the first digital data includes an image of the first person, the method including the steps of: (a) identifying the first person by using at least one out of additional information of the first person; and (b) automatically attaching the identification information of the first person to the first digital data, wherein the additional information includes at least one of information: information which indicates that if a first digital data group includes an image of a second person, a probability that the first person is determined to be the second person is increased, the first digital data group being comprised of the first digital data and other digital data distributed in a same cluster as that including the first digital data, information which indicates that if the first digital data is created while two or more people have a meeting, a probability that the image of the first person is of a transmitter or a receiver of communication made before the meeting, information which indicates that if an image of a third person is included m times in a second digital data group, a probability that the first person is the same as the third person increases as the number of the m increases, the second digital data group being comprised of the first digital data and other digital data, the m being a natural number, information associated with the first person acquired by using at least one of a time when the first digital data is created and a place where the first digital data is created as well as the life pattern information of the user of the digital equipment, information which indicates that a probability of the first person being determined to be a specific person is varied according to a position and a size of a face of the first person on the image of the first person, information which indicates that if the digital equipment is a dual camera and the first digital data is created through a lens of the dual camera directed toward the user, a probability that the first person is determined to be the user of the digital equipment is increased, and information which indicates that if the digital equipment is the dual camera and the first digital data is created through a lens of the dual camera directed toward the opposite side of the user, a probability that the first person is determined to be the user of the digital equipment is decreased.

In accordance with another aspect of the present invention, there is provided a method for assigning one or more second tags to a first digital data additionally, the second tags being different from a first tag which has been attached to the first digital data, wherein a specific user creates the first digital data, including at least one of images of a specific person P or a specific object O at a specific space S in a specific time zone T of a day, by using a digital equipment, wherein at least one of information on the specific space S, the specific person P, the specific object O, and the specific time zone T has been attached to the first digital data as the first tag, wherein the first digital data which is newly created and a plurality of existing digital data are stored in a database included in a digital data management system, the method including the steps of: (a) searching identical_tag_on_digital_data having the same tag as the first tag from the existing digital data; (b) calculating how frequently each of residual tags, excluding the same tags as the first tag, from all the tags assigned to the identical_tag_on_digital_data, is assigned to the identical_tag_on_digital_data; (c) displaying candidate tags, having the top N frequency among the residual tags, on a screen of the digital equipment; (d) selecting at least one of the candidate tags by the user; and (e) assigning the selected candidate tags to the first digital data as the second tags of the first digital data.

MODE FOR THE INVENTION

The First Additional Information for Person Recognition

Figure 1:
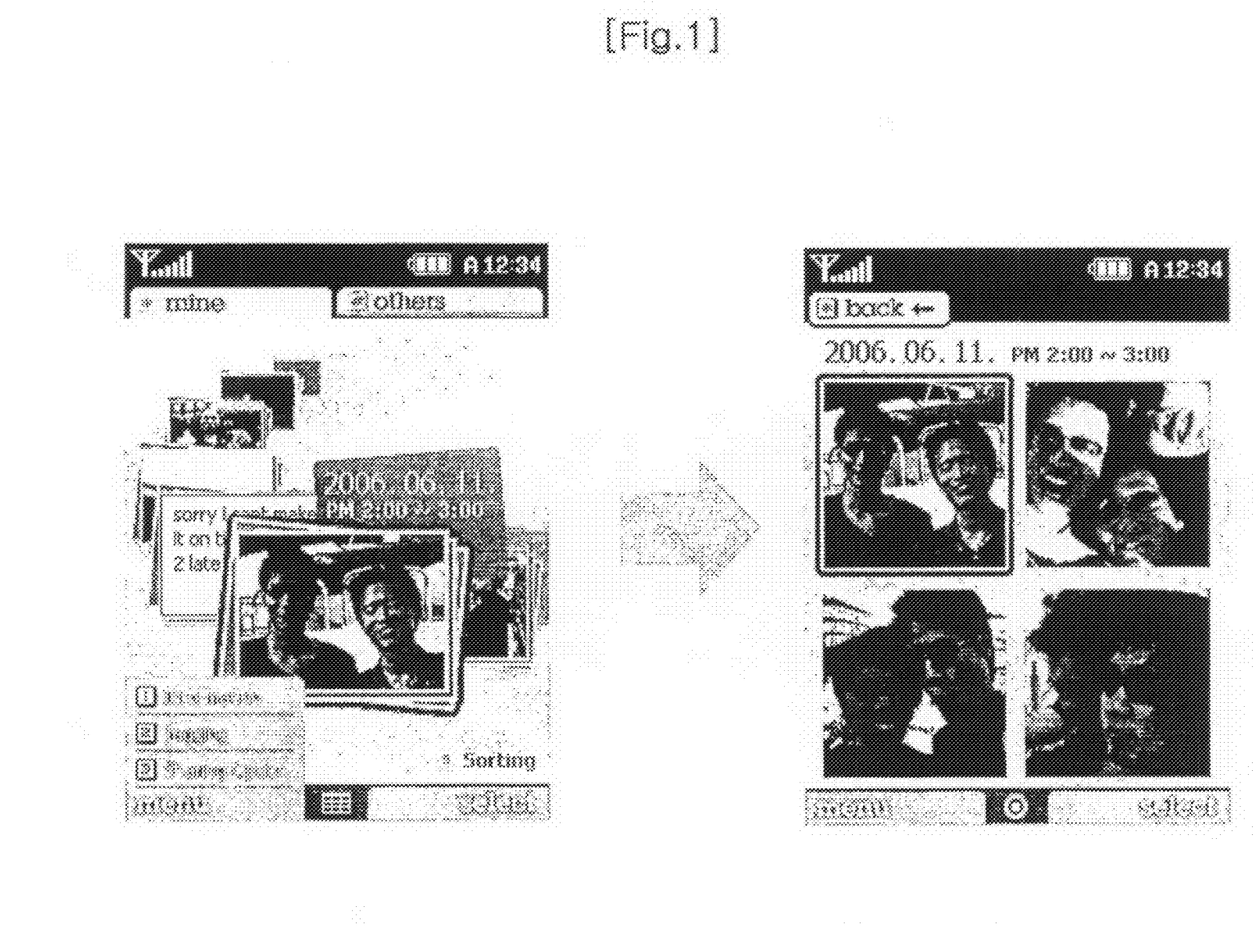
FIG. 1 illustrates an example of improving the accuracy of person recognition based on the observation that if a specific person appears on any one of photos in a same cluster, the specific person may also appear on other photos in the same cluster in accordance with a preferred embodiment of the present invention.

FIG. 1 illustrates an example of improving the accuracy of person recognition based on the observation that if a specific person appears on any one of photos in a same cluster, the specific person may also appear on the other photos in the same cluster in accordance with a preferred embodiment of the present invention. The cluster may be partitioned by referring to the time when digital data such as digital photos are created or the place where the digital data are created.

The concept of the cluster is also mentioned in the section of "cluster tagging" included in the detailed description of Korean Patent Application No. 2006-14040 filed by the applicant of the present invention. According to it, the digital data may be created by using a digital device at any time and at any place. However, due to the discontinuity of the time when the digital data is created or the place where the digital data is generated, the digital data shows a discontinuous distribution. It is derived from the observation that, in a daily life, the digital data tends to be produced only in certain time and place by a user. Therefore, the cluster tagging for clustering relevant digital data into one cluster by acquiring the place or the time pertaining to the various digital data, and assigning a common tag to all the relevant digital data may be adopted.

The person tag can be extracted with a high accuracy by applying the concept of the cluster tagging as set forth above in accordance with present invention. In other words, if a plurality of digital data are created within a same cluster and an image of a specific person is included in one of the plurality of the digital data, the image of the specific person may also appear on the other photos in the same cluster. More specifically, it is based on the observation that a plurality of digital data may be created for a specific person with different poses within a range of a specific time, and moreover, plenty of digital data may be created for the specific person with different backgrounds within a range of a specific place. In other words, it may be the general tendency of people.

Accordingly, the accuracy of the recognition rate can be significantly enhanced by using the tendency that the specific person may repeatedly appear within the same cluster, thereby assigning an appropriate person tag to the digital data created at the ranges of the specific time of place.

Specifically, a list of candidates who are determined to be appeared top n frequently on photos taken within a cluster is created by analyzing the frequency of appearance of people in the images of digital data which have already been created within the same cluster. Thereafter, if digital data including an image of a specific person is newly created in the same cluster, one of people who have been assigned the highest top n probability, i.e., the highest top n frequency of appearance, among the list of candidates which has already been created may be determined to be the specific person of the newly created digital data. Then, if the identity of the specific person appearing on the image of the newly created digital data is determined, it is possible to update a probability value assigned to each person included in the list of candidates in real-time. This process may be performed by a decision fusion, e.g., a Bayesian inference, which will be described later.

The Second Additional Information for Person Recognition

Figure 2:
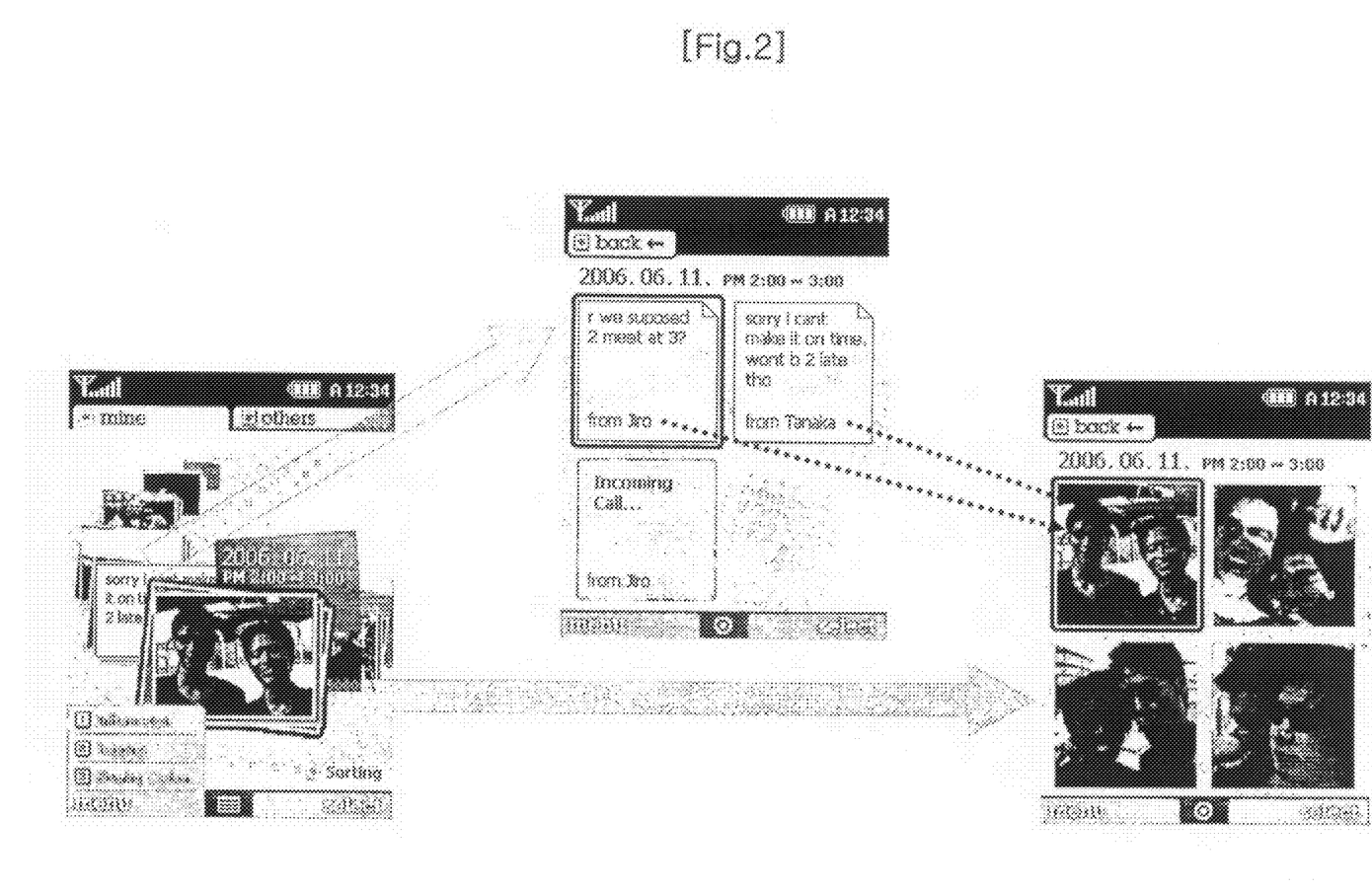
FIG. 2 shows an example of improving the accuracy of the person recognition based on the observation that a person appearing on a photo taken during a meeting with other person may be a transmitter or a receiver of communication since two or more people tend to communicate with each other through an e-mail, a telephone, an SMS message or the like prior to the meeting in accordance with another preferred embodiment of the present invention.

FIG. 2 shows an example of improving the accuracy of the person recognition based on the observation that a person appearing on a photo taken during a meeting with other person may be a transmitter or a receiver of communication since two or more people tend to communicate with each other through an e-mail, a telephone, an SMS message, a chatting service (e.g., MSN messenger) or the like prior to the meeting in accordance with another preferred embodiment of the present invention.

As shown in the example of message communication of FIG. 2, people generally tend to communicate with each other to make a decision on a place or a time for a meeting, prior to the meeting. Such a communication may be performed through the email, the telephone, the SMS message using a cellular phone, and the chatting service. A detailed example of message communication shown in FIG. 2 is as follows. That is, it can be seen that two users, e.g., Jiro and Tanaka, have communicated with each other to make a decision on the time when they meet through the SMS message, and then actually, photos on which both Jiro and Tanaka appear were created after the communication. Thus, the accuracy of recognition on people appearing on photos can be improved by fully considering such correlation.

The above-described additional information can be applied as a very strong tool since it is considered to be the general tendency of people. In detail, two or more people apart from each other are required to meet at a specific place after a fixed time in order to take photos together. In order for them to meet at the specific place, the communication must be made between them to make a decision on a place and a time for the meeting. By using such a general tendency of people properly, the accuracy of recognition on people appearing on images of digital data can be significantly enhanced.

Specifically, a list of candidates may be created after finding out the transmitter and the receiver of the communication made during a certain time before digital data is newly created, as set forth above. Thereafter, if the digital data including an image of a specific person is newly created, one of people who have been assigned the highest top n probability among the list of candidates which has already been created may be determined to be the specific person of the newly created digital data. Then, if the identity of the specific person appearing on the image of the newly created digital data is determined, it is possible to update a probability value assigned to each person included in the list of candidates in real-time. Afterwards, if another digital data including an image of a certain person is newly created, the identity of the certain person is determined on the basis of the list of candidates which has been updated. This process may be conducted by the decision fusion, e.g., the Bayesian inference, which will be described later.

The Third Additional Information for Person Recognition

Figure 3:
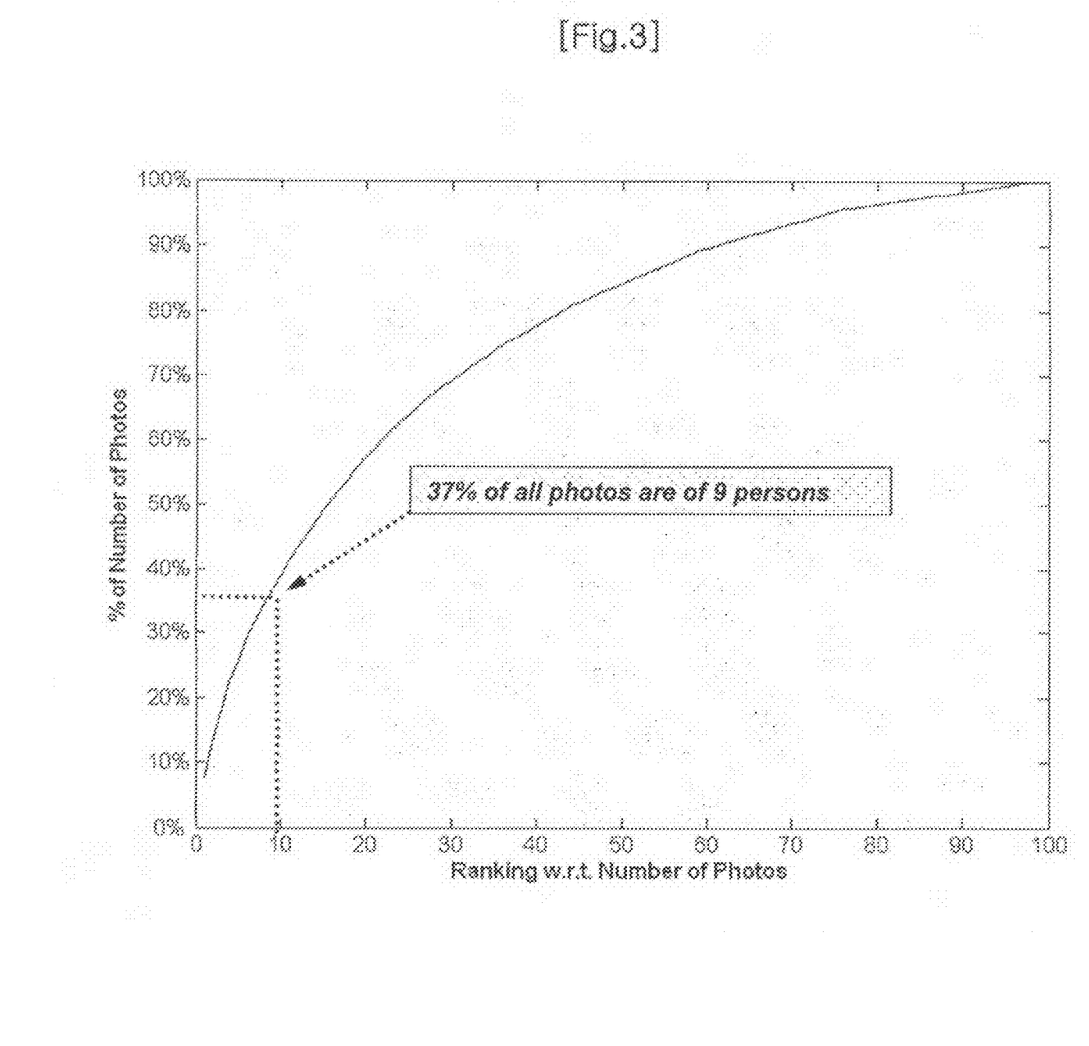
FIGS. 3 and 4 exemplify examples of improving the accuracy of the person recognition based on the observation that only intimate people out of all people who have been taken a picture of at least one time may frequently appear on the photos in accordance with still another preferred embodiment of the present invention.
Figure 4:
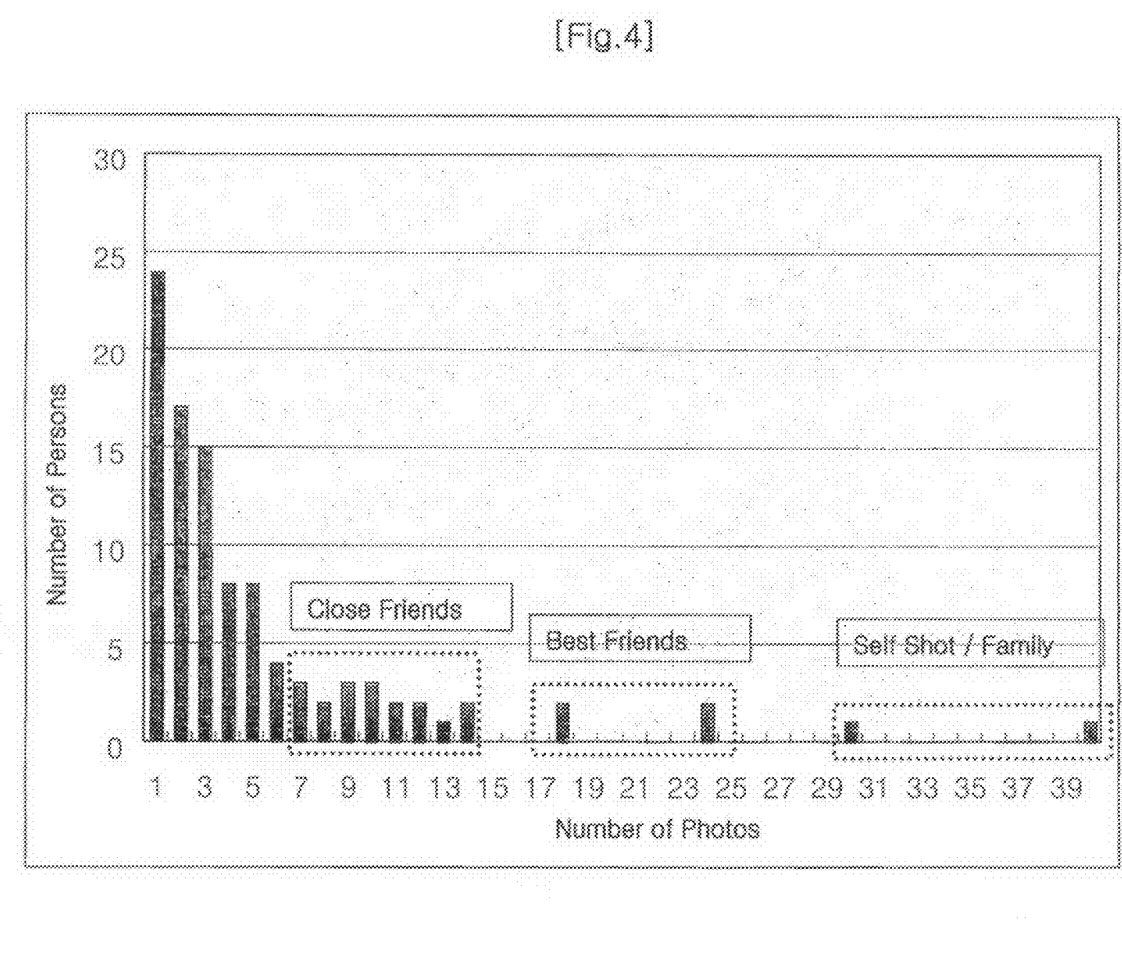

FIGS. 3 and 4 exemplify examples of improving the accuracy of the person recognition based on the observation that only intimate people out of all people who have been taken a picture of at least one time may frequently appear on the photos in accordance with still another preferred embodiment of the present invention.

In FIG. 3, x-axis represents a rank of people who has appeared on photos at least one time, the rank being determined according to the frequency of the appearance of each person in descending order, while the total number of individual persons appearing on the photos is set to be 100, and y-axis represents a percentage of photos while the total number of photos corresponds to 100%. Arbitrary coordinate values (X and Y) on the graph depicted on an xy plane represent that the number of photos where top X persons appear corresponds to Y % in total.

For example, as shown in FIG. 3, it can be seen that the number of photos where top 9 persons appear occupies 37% of the total number of photos. This indicates that the 9 persons only occupy 9% of the total number of persons (i.e., 100 persons) on photos, but the percentage occupied by the 9% of the total number of persons reaches up to 37% of the total number of photos. As shown in FIG. 3, it can be found that the graph is highly tilted toward left-upper side.

If a graph were directly proportional in the xy-plane, it would represent that all people appear on the photos at the identical frequency, which means that there is no useful information for the face recognition. However, people actually tend to take photos with their intimate ones, so that if a graph is highly deviated from a directly proportional graph, as shown in FIG. 3, it has an extremely valuable information for the face recognition, thereby enhancing the accuracy of the recognition of people appearing on photos.

FIG. 4 is a bar graph (X, Y) in which x-axis represents the number of photos and y-axis represents the number of persons. Herein, the bar graph (X, Y) indicates that Y-number of persons have X-number of photos on which their own faces appear. For example, a bar where X=1 and Y=24 means that 24 persons have 1 sheet of photo, respectively, where their own faces appear. Further, another bar where X=40 and Y=1 represents that 1 person has as many as 40 sheets of photos where his or her own face appears.

There are three boxes with dotted line as shown in FIG. 4. The rightmost box indicates people whose photos are taken at the highest frequency, so that the photos included in the rightmost box may be self-shots or family photographs. Moreover, the middle box shows people whose photos are taken at the second highest frequency, so that the photos included in the middle box may contain images of best friends. Furthermore, the leftmost box shows people whose photos are taken at the third highest frequency, so that the photos included in the leftmost box may contain images of intimate friends. Finally, photos belonging to bar graphs located at left side of the leftmost box may contain images of acquaintance. In this regard, there may be naturally a personal difference. The personal difference can be applied by updating the list of candidates as mentioned above. For example, photos belonging to the rightmost box may be of best friends rather than of self-shot or family members according to the personal difference. The identity of people included in each box can be modified by using the feedback from the human relationship, i.e., the feedback from the analysis of the frequency of appearance of person on photos previously taken, so that the accuracy of face recognition on people appearing on photos can be enhanced.

In short, a list of candidates is created by analyzing top n persons appearing on photos, i.e., digital data, which are already created, at the highest frequency. Thereafter, if the digital data including an image of a specific person is newly created, one of people who have been assigned the highest top n probability among the list of candidates which has already been created may be determined to be the specific person of the newly created digital data.

Then, if the identity of the specific person appearing on the image of the newly created digital data is determined, it is possible to update a probability value assigned to each person included in the list of candidates in real-time. Afterwards, if another digital data including an image of a certain person is newly created, the identity of the certain person is determined on the basis of the list of candidates which has been updated. This process may be performed by the decision fusion, e.g., the Bayesian inference, which will be described later.

The Fourth Additional Information for Person Recognition

In order to enhance the accuracy of recognition on faces of people appearing on photos, i.e., digital data, one or more tags either automatically or manually attached to the digital data can be referred to. For example, space tags or time tags either automatically or manually attached to the digital data may be referred to. Specifically, the recognition on certain people appearing on the digital data can be performed by referring to the tags attached to the digital data in addition to life patterns of the certain people.

For instance, if photos, i.e., digital data, including the certain people are taken during a weekend (that is, time tags of the digital data indicate the weekend), weight may be set to the probability that the certain people on the photos are family members or friends; if the photos are taken during weekdays (that is, the time tags of the digital data indicate weekdays), the weight may be set to the probability that the certain people on the photos are fellow workers; if the photos are taken at a pub (that is, space tags of the digital data indicate the pub), the weight may be set to the probability that the certain people on the photos are friends or fellow workers; and if the photos are taken at home (that is, the space tags of the digital data indicate home), the weight may be set to the probability that the certain people on the photos are family members.

In the same way, even if the certain people have peculiar life patterns, for example, if the certain people generally have a meeting with their friends at an amusement park rather than at a pub, or if the certain people enjoy solitude rather than being with family members or friends during weekends, the peculiar life patterns can be automatically analyzed by analyzing the existing photos, thereby modifying the weight of the probability according thereto.

In summary, the life patterns of the certain people appearing on images of the existing digital data are analyzed to create a list of candidates, the list including top n persons who are assigned a high probability of being determined to be specific people appearing on images of digital data which are going to be newly created at a specific time and in a specific place. Thereafter, if the digital data including the images of the specific people are newly created, one of people who have been assigned the highest top n probability among the list of candidates which has already been created may be determined to be the specific people of the newly created digital data.

Then, if the identities of the specific people appearing on the images of the newly created digital data are determined, it is possible to update a probability value assigned to each person included in the list of candidates in real-time. Afterwards, if another digital data including an image of a particular person is newly created, the identity of the particular person is determined on the basis of the list of candidates which has been updated. This process may be performed by the decision fusion, e.g., the Bayesian analysis, which will be described later.

The Fifth Additional Information for Person Recognition

The accuracy of face recognition can be enhanced by analyzing the locations and the sizes of one or more faces appearing on a photo. For example, if one large-sized face of a specific person appears at the center of a photo, the photo may be a self-shot of the specific person; and if one large-sized face of the specific person appears at the center of the photo and very small-sized faces appear around the large-sized face, the large-sized face at the center of the photo may be a self-shot of the specific person and the very small-sized faces may be strangers, e.g., walkers. Further, if two faces of similar sizes appear on the photo and one of the two faces is already tagged as "me", it is likely that the identity of the other face is my best friend or my girl friend. As mentioned above, it is possible to update the probability value assigned to each person included in the list of candidates in real-time by analyzing existing photos, e.g., general tendencies or peculiar habits of people appearing on the existing photos. This process can be carried out with reference to the decision fusion, e.g., the Bayesian inference, which will be described later.

Besides, there may be a lot of methods for enhancing the accuracy of the face recognition. For instance, in case of a dual camera, an identity of a person on a photo taken through one lens directed toward a user of the camera may be the user himself or herself; and the identity of the person on the photo taken through the other lens directed toward the opposite side of the user may be a friend of the user. Under the assumption that the self-shot occupy a considerable part of all the photos, the accuracy of the face recognition can be enhanced because the self-shot is excluded if the other lens of the camera directed toward the opposite side of the user is used.

Figure 5:
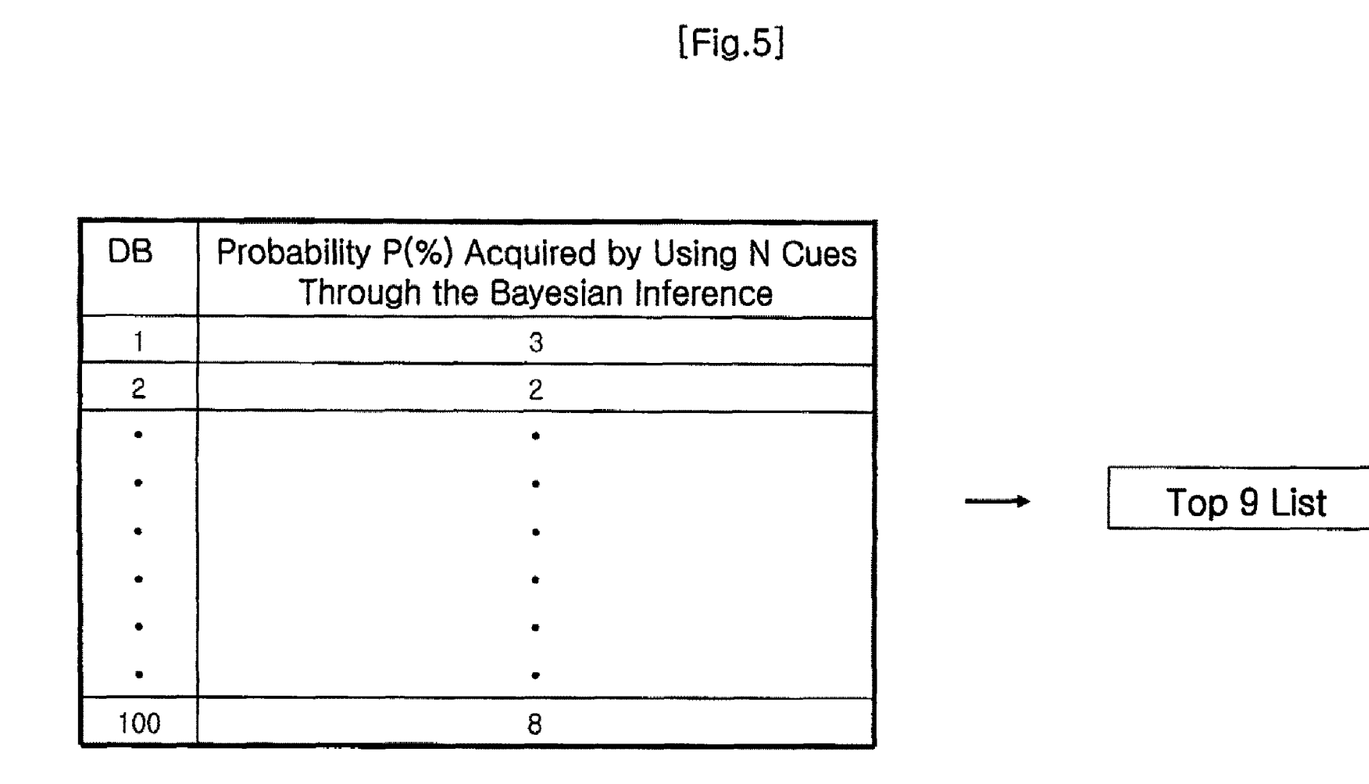
FIG. 5 presents an example of making a top-n list through the combination of results of the person recognition by adopting the Bayesian inference in accordance with the present invention.

Combination of Additional Information for Person Recognition Through Decision Fusion FIG. 5 illustrates a process of making a top-n list through the combination of cues in accordance with the above-described embodiments by the decision fusion, e.g., the Bayesian inference, wherein the top-n list includes top n persons who are assigned high probabilities of being determined to be a specific person included in images of newly created digital data, the n being a natural number, e.g., 9.

The decision fusion is a recursive process for combining information which is accumulated as time goes by in order to reply to some scientific questions. Specifically, the decision fusion is an analytical method for evaluating the current status of a subject, i.e., an issue, collecting new data to answer the questions about the subject, and updating the knowledge about the subject by combining the collected new data and the existing data, thereby reducing errors. In short, the decision fusion represents a process for making a decision on a specific issue by using multiple cues and a priori probability.

The decision fusion includes various methods such as an ad-hoc method, the Bayesian inference, etc. The ad-hoc method calculates probabilities from each of the cues and obtains a final probability by summing up the calculated probabilities, e.g., by using "weighted probability sum" to create a top-n list. Unlike the ad-hoc method, the Bayesian inference creates a top-n list by calculating a probability that takes into account all the cues. In general, the cues are not independent from each other. For example, there exists a case where a time factor and a space factor are correlated. Specifically, an office worker probably stays in his/her office (the space factor) during daytime of weekdays (the time factor). Since the cues are not independent as mentioned above, the ad-hoc method may not be optimal. Therefore, the Bayesian inference is preferred rather than the ad-hoc method in accordance with the present invention. However, it should be noted that the ad-hoc method can be adopted to embody the present invention in certain cases.

By using the Bayesian inference, a top-9 list can be created by combining additional information which was obtained from the above-described embodiments. A box on the left side shown in FIG. 5 indicates a probability of being determined to be a specific person on digital data which are going to be newly created, for each of 100 persons, under the assumption that the total number of persons on all the existing photos is 100. Herein, the probability is calculated by using all of the above-mentioned additional information for the face recognition. The probability written in the box on the left side shown in FIG. 5 is updated whenever digital data is newly created, which is caused by the attributes of the Bayesian inference. Afterwards, if another digital data including images of a certain person are newly created, an identity of the certain person may be determined on the basis of the updated probability. In other words, the probability is dynamically modified, thereby achieving more accurate estimation. As a result, the top-9 list shown in a box on the right side of FIG. 5 can be created by using the Bayesian inference. By referring to the created top-9 list, errors that might be caused during the face recognition process can be significantly removed.

Additional Tag Recommendation Function

Figure 6:
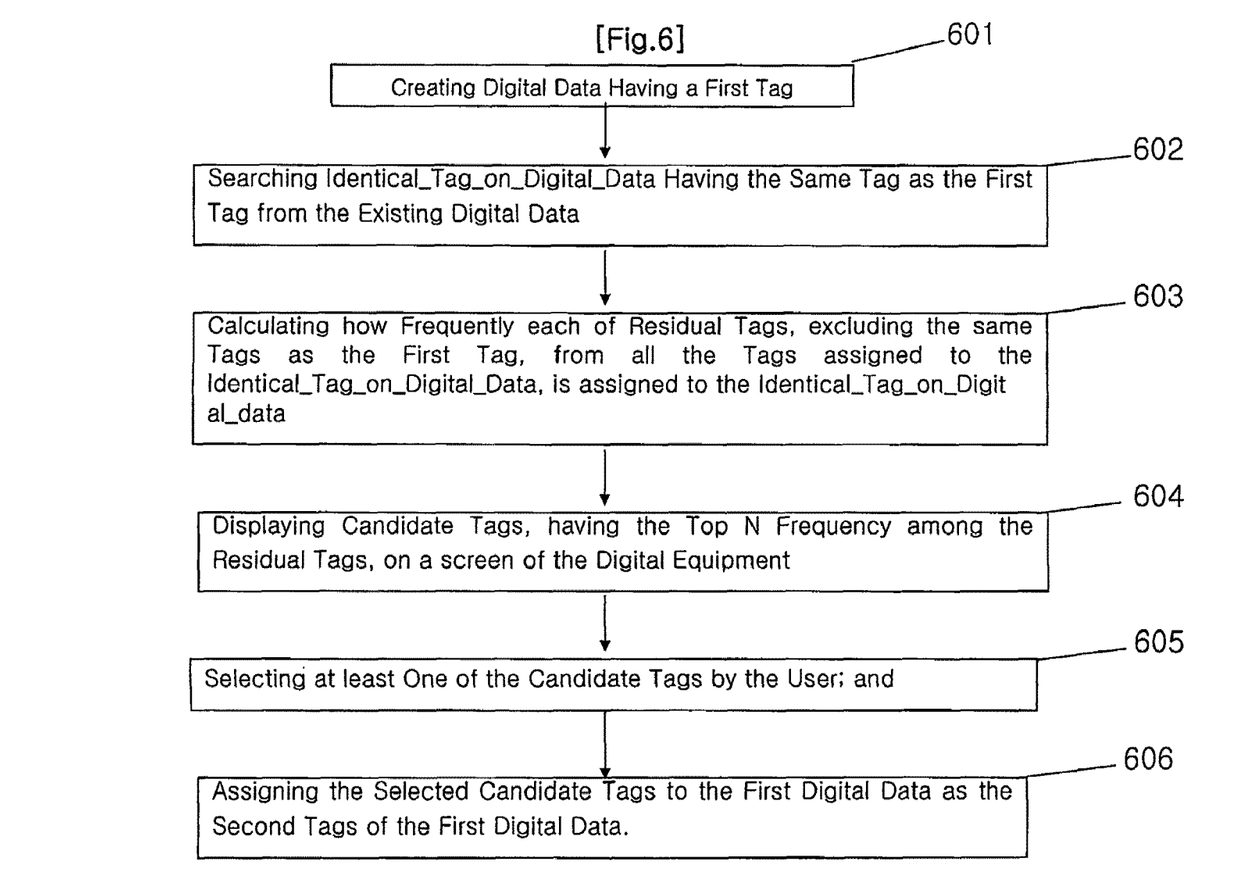
FIG. 6 illustrates a flowchart for describing a method for recommending an additional tag in accordance with a further another preferred embodiment of the present invention.

FIG. 6 illustrates a flowchart describing a method for recommending one or more additional tags in accordance with a further another preferred embodiment of the present invention.

First of all, digital data, including at least one of images of a specific person or a specific object at a specific time zone during one day at a specific place, are newly created by using a digital equipment by a specific user, while a plurality of existing digital data are stored in a database of a digital data management system (step 601). The newly created digital data have one or more tags including information on at least one of a space, a person, an object, and a time zone, and the tags are automatically assigned to the digital data at the time of the creation thereof (see, Korean Patent Application No. 2006-14040 filed by the same applicant as that of the present invention).

Thereafter, digital data having the same tags as those automatically assigned to the newly created digital data are searched from the database (step 602). Herein, specific tags, excluding the same tags described in the step 602, attached to the searched digital data are called residual tags.

Then, how frequently each of the residual tags has been assigned to the searched digital data is calculated (step 603).

Subsequently, candidate tags having the top N frequency among the residual tags are displayed on a screen of the digital equipment for the user's selection (step 604), and one or more tags are selected by the user from the candidate tags displayed on the screen (step 605).

Accordingly, additional tags, i.e., the selected tags, are attached to the newly created digital data (step 606).

For example, it is likely that a specific user frequently attaches a tag called "shopping" or "date" to digital data if the specific user and his girl friend often shop at a specific department store when they take photos together. As can be seen from the above-mentioned Korean Patent Application No. 2006-14040, the digital data created by using the digital equipment by the specific user may be automatically tagged with the "specific department store" by using GPS for tracking the position of the digital equipment. Further, a name of the girl friend may be automatically tagged through face recognition on a person appearing on the digital data in accordance with the present invention. In this case, if existing digital data having the same tags as those attached to the newly created digital data automatically, e.g., the specific department store or the name of the girl friend, are searched from the database, tags attached to the searched digital data with a high frequency may be tags of "shopping" or "date". By calculating the rank of the frequency through the decision fusion, e.g., the Bayesian inference, a top-n list including tags with top n frequency, e.g., a top-9 list can be created. The top-n list is displayed on the screen of the digital equipment so that the user can select any of them. Accordingly, the present invention can implement a user-friend tag inputting method, which cannot be realized by the prior arts such as the flickr and the like.

Meanwhile, the top-n list is updated in real-time through the Bayesian inference; and therefore, if another digital data is newly created, tags of just previously created digital data are also reflected so that the user can select additional tags from the updated top-n list.

While the invention has been shown and described with respect to the preferred embodiments, it will be understood by those skilled in the art that various changes and modification may be made without departing from the spirit and scope of the invention as defined in the following claims.

The invention claimed is:

1. A method for tagging identification information of a first person to a first digital data created by using a digital equipment in a digital data management system, wherein the digital data management system includes both identification information and life pattern information of a user who creates a plurality of digital data by using the digital equipment, and the first digital data includes an image of the first person, the method comprising the steps of:
    (a) identifying the first person by using at least one out of additional information of the first person; and
    (b) automatically attaching the identification information of the first person to the first digital data,
    wherein the additional information includes at least one of information:
    information which indicates that if a first digital data group includes an image of a second person, a probability that the first person is determined to be the second person is increased, the first digital data group being comprised of the first digital data and other digital data distributed in a same cluster as that including the first digital data,
    information which indicates that if the first digital data is created while two or more people have a meeting, a probability that the image of the first person is of a transmitter or a receiver of communication made before the meeting is increased,
    information which indicates that if an image of a third person is included m times in a second digital data group, a probability that the first person is the same as the third person increases as the number of the m increases, the second digital data group being comprised of the first digital data and other digital data, the m being a natural number,
    information associated with the first person acquired by using at least one of a time when the first digital data is created and a place where the first digital data is created as well as the life pattern information of the user of the digital equipment,
    information which indicates that a probability of the first person being determined to be a specific person is varied according to a position and a size of a face of the first person on the image of the first person,
    information which indicates that if the digital equipment is a dual camera and the first digital data is created through a lens of the dual camera directed toward the user, a probability that the first person is determined to be the user of the digital equipment is increased, and
    information which indicates that if the digital equipment is the dual camera and the first digital data is created through a lens of the dual camera directed toward the opposite side of the user, a probability that the first person is determined to be the user of the digital equipment is decreased.

2. The method of claim 1, wherein the step (a) includes a step of combining the additional information by a decision fusion, the decision fusing being a general term of a process for making a decision on a specific issue from multiple cues and a priori probability.

3. The method of claim 2, wherein the decision fusion includes Bayesian inference or ad-hoc analysis.

4. The method of claim 3, wherein the step (a) further includes a step of creating a top-n list, in which candidates having the top n probability of being determined to be the first person are included, based on the result of the combination of the additional information through the Bayesian inference or the ad-hoc analysis.

5. The method of claim 4, wherein the top-n list is updated in real-time through the Bayesian inference or the ad-hoc analysis.

6. The method of claim 4 or 5, wherein the step (b) includes a step of determining the first person to be a person having the highest probability among the candidates of top-n list.

7. The method of claim 1, wherein the communication is at least one of e-mail communication, wire or wireless telephone communication, SMS message communication, and messenger communication.

8. The method of claim 1, wherein the information on the receiver or the transmitter of the communication made before the meeting is acquired from a communication device used for the meeting.

9. The method of claim 1, wherein the information on the receiver or the transmitter of the communication made before the meeting is acquired by recognizing contents of the communication.

10. The method of claim 1, wherein the information associated with the first person acquired by using at least one of the time when the first digital data is created and the place where the first digital data is created as well as the life pattern information of the user of the digital equipment is:
    information which indicates that a probability of the first person being determined to be a family member or a friend of the user is increased if the time corresponds to a holiday, and
    information which indicates that a probability of the first person being determined to be a fellow worker of the user is increased if the time corresponds to a weekday.

11. The method of claim 1, wherein the information associated with the first person acquired by using at least one of the time when the first digital data is created and the place where the first digital data is created as well as the life pattern information of the user of the digital equipment is:
    information which indicates that a probability of the first person being determined to be a friend or a fellow worker of the user is increased if the place is a drinking house or a bar, and information which indicates that a probability of the first person being determined to be a family member of the user is increased if the place is home.

12. The method of claim 11, wherein the place is perceived by referring to tags attached to the first digital data.

13. The method of claim 1, wherein if the first digital data further includes an image of a fourth person, the information which indicates that a probability of the first person being determined to be a specific person is varied according to a position and a size of a face of the first person on the image of the first person is:

information which indicates that a probability of the first person being determined to be the specific person is decreased if a face of the fourth person is positioned at the center of the whole image of the first digital data and the face of the fourth person is remarkably larger than that of the first person.

14. The method of claim 1, wherein if the first digital data further includes an image of a fifth person, the information which indicates a probability of the first person being determined to be a specific person is varied according to a position and a size of a face of the first person on the image of the first person is:

information which indicates that a probability of the first person being determined to be a friend of a fifth person is increased if a size of the face of the first person is similar to that of a face of the fifth person.

15. The method of claim 14, wherein the fifth person is identified by referring to tags attached to the first digital data.

16. A method for assigning one or more second tags to a first digital data additionally, the second tags being different from a first tag which has been attached to the first digital data, wherein a specific user creates the first digital data, including at least one of images of a specific person P or a specific object O at a specific space S in a specific time zone T of a day, by using a digital equipment, wherein at least one of information on the specific space S, the specific person P, the specific object O, and the specific time zone T has been attached to the first digital data as the first tag, wherein the first digital data which is newly created and a plurality of existing digital data are stored in a database included in a digital data management system, the method comprising the steps of:

(a) searching identical_tag_on_digital_data having the same tag as the first tag from the existing digital data;

(b) calculating how frequently each of residual tags, excluding the same tags as the first tag, from all the tags assigned to the identical_tag_on_digital_data, is assigned to the identical_tag_on_digital_data;

(c) displaying candidate tags, having the top N frequency among the residual tags, on a screen of the digital equipment;

(d) selecting at least one of the candidate tags by the user; and (e) assigning the selected candidate tags to the first digital data as the second tags of the first digital data.

17. The method of claim 16, wherein the frequency is calculated by a decision fusion, the decision fusion being a general term of a process for making a decision on a specific issue from multiple cues and a priori probability.

18. The method of claim 17, wherein the decision fusion includes Bayesian inference or ad-hoc analysis.

19. The method of claim 18, wherein the candidate tags are updated in real-time.

\* \* \* \* \*